Patented June 26, 1923.

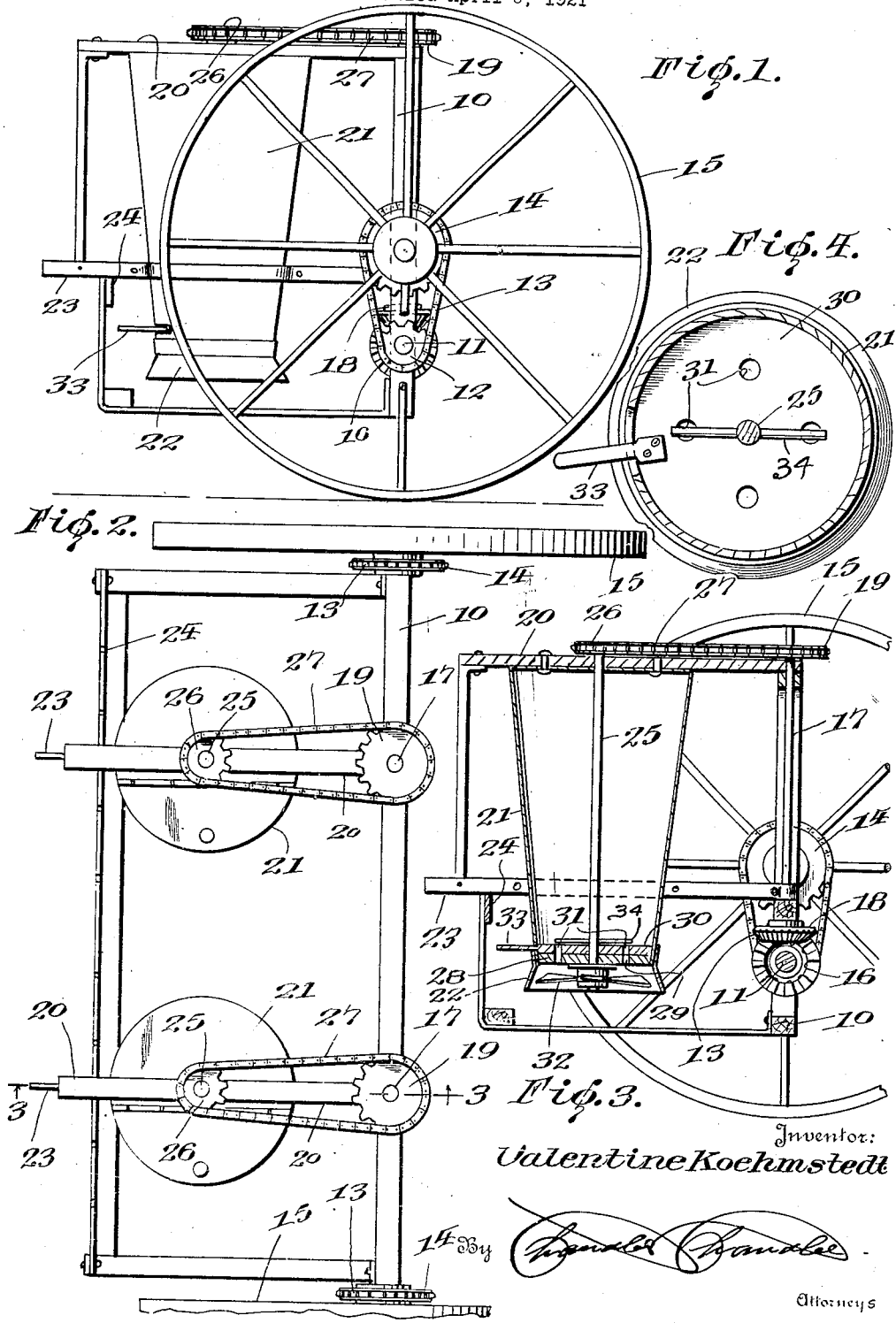

1,459,915

UNITED STATES PATENT OFFICE.

VALENTINE KOEHMSTEDT, OF GRAFTON, NORTH DAKOTA.

INSECTICIDE SPRAYER.

Application filed April 6, 1921. Serial No. 459,090.

*To all whom it may concern:*

Be it known that I, VALENTINE KOEHMSTEDT, a citizen of the United States, residing at Grafton, in the county of Walsh, State of North Dakota, have invented certain new and useful Improvements in Insecticide Sprayers; and I do hereby declare the following to be a full, clear, and exact description of the invention, such as will enable others skilled in the art to which it appertains to make and use the same.

This invention relates to new and useful improvements in spraying devices and particularly to devices for spraying insecticides on plants.

One object of the invention is to provide a spraying device which will deposit the insecticide directly on the plant without the usual annoyance of the powder flying onto the driver or operator of the machine.

Another object is to provide novel and simple means for adjusting the powder depositing devices for differently spaced rows of plants.

A further object is to provide means for adjusting the discharge of the insecticide from the hoppers.

Other objects and advantages will be apparent from the following description when taken in connection with the accompanying drawing.

In the drawing:

Figure 1 is a side elevation of a spraying machine made in accordance with the invention.

Figure 2 is a top plan view of the same.

Figure 3 is a vertical sectional view on the line 3—3 of Figure 2.

Figure 4 is an enlarged horizontal sectional view through one of the hoppers, just above the perforated discharge plate.

Referring particularly to the accompanying drawing, there is shown a main frame 10, on which is supported the longitudinally extending drive shaft 11 carrying a sprocket wheel 12, driven by a chain 13, from the sprocket wheel 14 on the ground wheel 15, of the machine. Secured on this shaft, at intervals, are the bevel gears 16. Also mounted on the frame 10 are the vertical shafts 17, each one having on its lower end a bevel gear 18 which meshes with one of the gears 16, whereby the said vertical shafts are driven from the main drive shaft 11. On the upper end of each vertical shaft is mounted a sprocket wheel 19.

Mounted for horizontal swinging movement, on the frame 10, are the frames 20, and supported in each of the swinging frames is a vertical insecticide powder containing hopper 21. The hopper is tapered toward its lower end, and has the flaring circular baffle wall 22, at its lower end. A laterally extending lever 23 is carried by each frame 20 for manipulation to swing the frame into the desired position with respect to the row of plants on which the powder is to be discharged. Each of the frames 20 has for its pivot, in its swinging movement, a vertical shaft 17, whereby the gears 16 and 18 will always remain in meshing engagement. Means, such as the toothed plate 24, is mounted on the frame 10 for engagement by the levers 23, to hold the levers against movement, and thus maintain the swinging frame and hopper in its adjusted position.

Extending vertically and longitudinally through each of the hoppers is a shaft 25, and on the upper end of the shaft is a sprocket wheel 26, said sprocket wheel being driven by a chain 27, engaged therearound and around the adjacent sprocket wheel 19.

In the lower portion of each of the hoppers, above the flaring baffle wall 22, is a bottom disk 28 through which the vertical shaft 25 is centrally disposed, said disk being stationary in the hopper. Around the center of the disk 28 are the discharge openings for the insect powder, shown at 29. Above the vertical shaft 25, and rotatable thereon, and on the stationary disk 28, is a second disk 30, the same having a series of similarly arranged openings 31 which are arranged to register with the openings 29, to regulate the discharge of the insecticide. Also carried by each vertical shaft 25, within the flaring mouth of the hopper, and below the disk 28, is a circular series of agitator blades 32, which serve to throw the powder outwardly against the wall 22 as the powder drops thereon from the openings of the hopper.

As shown in the drawings the device is provided with two hoppers for the purpose of spraying two rows of plants at the same time. By adjusting the swinging frames 20 of the machine, the hoppers may be moved inwardly and outwardly, toward and away from each other to be disposed over plant rows which are at different distances apart.

Projecting from one portion of the edge of the disk 30 is a handle 33 which is adapted to be grasped to turn the disk and regulate the feed.

Disposed transversely through the vertical shaft 25, just above the upper disk 30, is a pin, the ends of which, as shown at 34, project from the opposite sides of the shaft, and serve to agitate the insecticide within the hopper, and force the same through the openings of the disks.

What is claimed is:

1. An insecticide sprayer for plants including a stationary insecticide hopper, a powder discharging means in the bottom of the hopper, a downwardly and outwardly flaring baffle wall carried by the bottom of the hopper below the discharging means, and a centrifugal throwing means within the flared wall in position to receive powder thereon from the discharging means and throw said powder outwardly against the inner face of the said wall.

2. An insecticide spraying device including a stationary hopper having a regulable discharge bottom, an agitator above the bottom, a horizontally rotatable fan below the said bottom for receiving powder from said discharge bottom, and a downwardly and outwardly flaring baffle wall secured to the bottom of the hopper and enclosing the fan in position to receive thereagainst the powder thrown outwardly by the fan and to deliver the powder vertically downward onto the plants.

In testimony whereof, I affix my signature, in the presence of two witnesses.

VALENTINE KOEHMSTEDT.

Witnesses:
 H. C. DE PUY,
 W. A. CROGAN.